United States Patent [19]

Harshbarger et al.

[11] Patent Number: 4,536,793
[45] Date of Patent: Aug. 20, 1985

[54] PULSE STRETCHING CIRCUIT FOR A RASTER DISPLAY

[75] Inventors: John H. Harshbarger, Xenia; William M. Shores, Dayton, both of Ohio

[73] Assignee: Visual Information Institute, Inc., Xenia, Ohio

[21] Appl. No.: 456,851

[22] Filed: Jan. 10, 1983

[51] Int. Cl.³ .............................................. H04N 5/06
[52] U.S. Cl. ................................... 358/150; 358/148; 358/319; 328/63; 328/111
[58] Field of Search ............... 358/148, 150, 152, 154, 358/311, 319; 328/63, 179, 187, 111; 331/20, 21, 145, 149, 153, 172; 315/384; 307/234

[56] References Cited
U.S. PATENT DOCUMENTS 4,360,825 12/1982 Srivastava ........................ 358/150
4,417,275 12/1983 Harshbarger et al. ............ 358/150

Primary Examiner—Tommy P. Chin
Assistant Examiner—Michael D. Parker
Attorney, Agent, or Firm—Albert L. Jeffers; John F. Hoffman

[57] ABSTRACT

A pulse stretching circuit for a raster display for causing certain vertical control pulses to either have the same widths or at least terminate at the same time in both the odd and even fields. The vertical blanking pulses or vertical sync pulses in the odd fields are stretched so that they terminate coincident with the trailing edges of the 2H rate horizontal blanking or sync pulses respectively.

16 Claims, 5 Drawing Figures

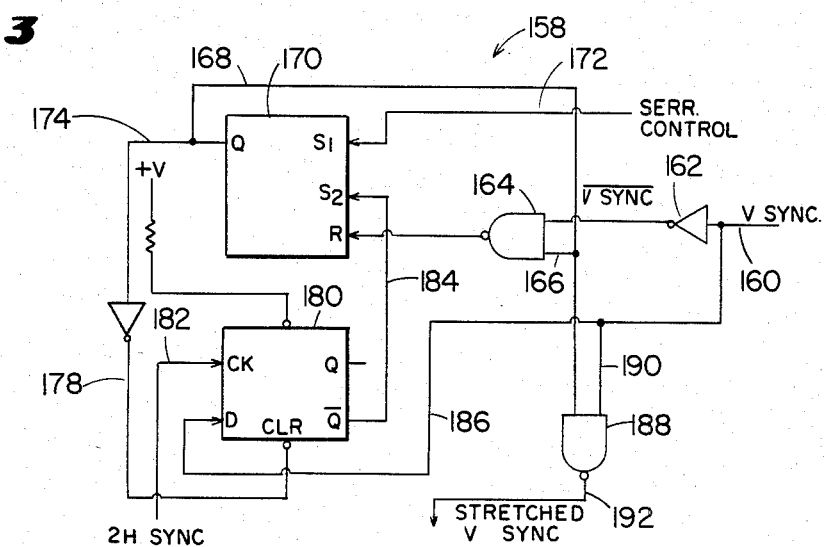
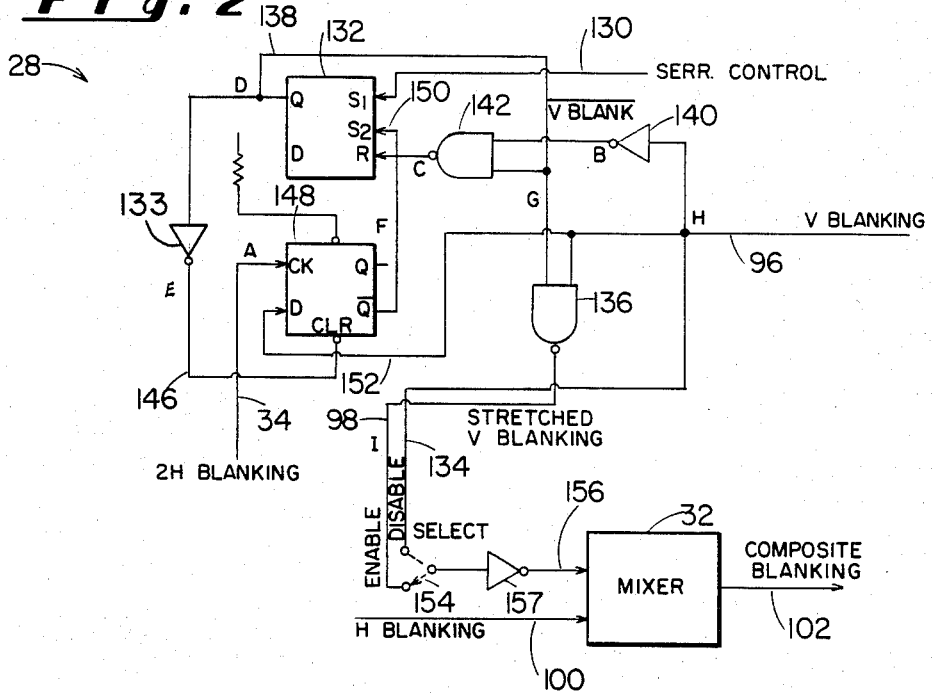

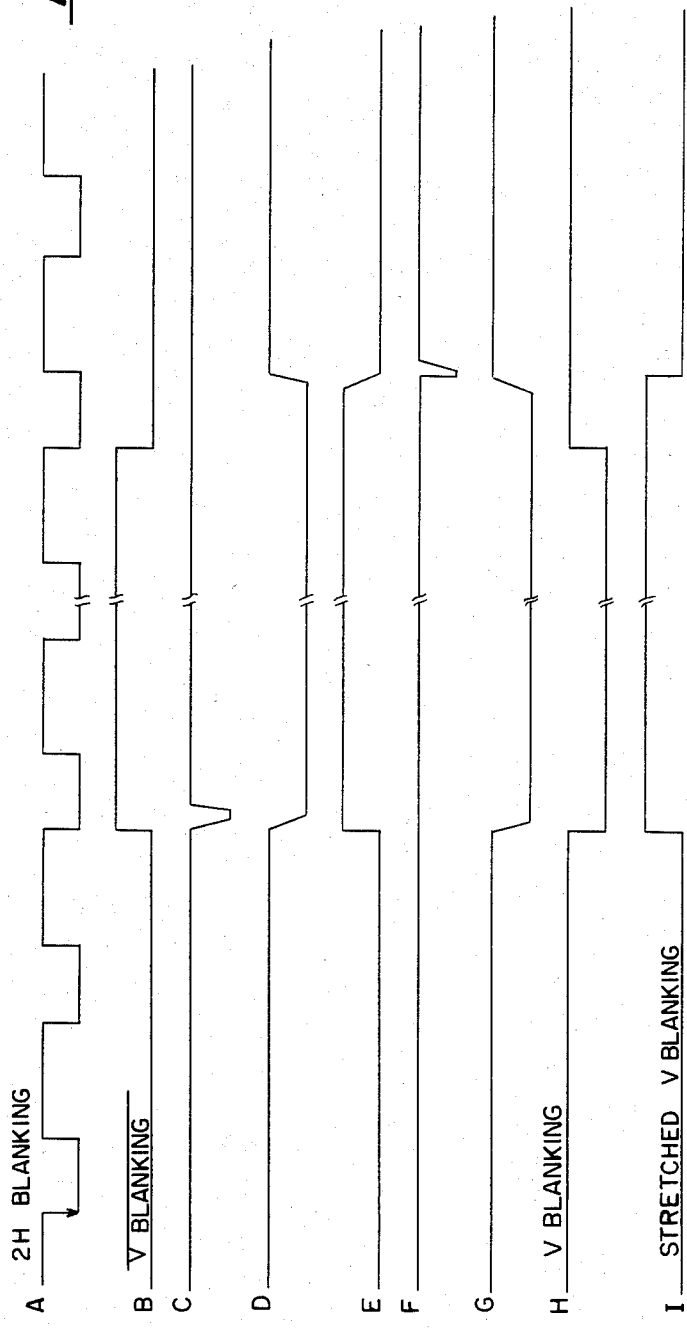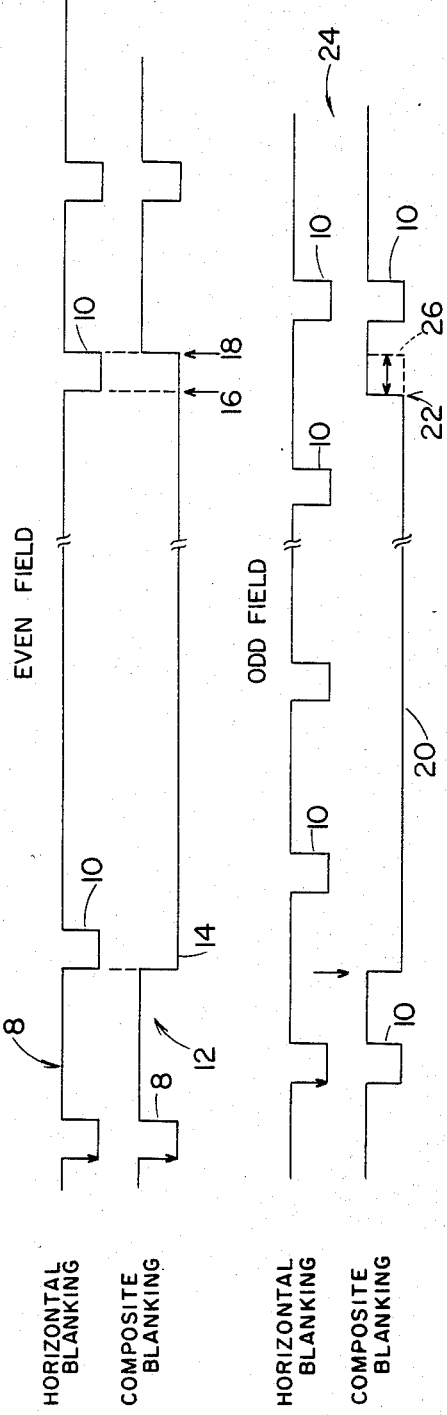

PULSE STRETCHING CIRCUIT FOR A RASTER DISPLAY

BACKGROUND OF THE INVENTION

The present invention relates to raster-type displays, such as televisions and computer displays, and more particularly to a system for adjusting the timing of vertical control pulses used for controlling the movement or blanking of the electron beam.

Traditional television equipment has been designed to operate from electronic signals that are defined by standards for either broadcast or non-broadcast applications. However, the application of television type equipment to new applications has brought deviations from standards and practice, and have led to difficulty in interfacing products to existing systems. This has been particularly true in interfacing television equipment with computers.

The scan rate for a particular television system, computer display or other raster-type display depends on the number of horizontal scanning lines per frame and the vertical field rate. In this application, the terms "horizontal" and "vertical" as applied to sync pulses, blanking pulses or other control signals are merely orthogonal coordinate references and are not restricted to vertical and horizontal directions in the true sense. Most commonly, the raster beam sweeps across the screen horizontally at a high rate to generate a vertical series of lines of information. However, the beam may sweep the screen as a plurality of vertical lines that are arranged in a horizontal series. Accordingly, for purposes of this application, the "horizontal" or "horizontal rate" sweeps and signals are those occurring at the higher frequency and the "vertical" or "vertical rate" sweeps and signals are those generated at the lower frequency.

Many television systems are interlaced to avoid a visible flicker in a display, usually in a 2:1 ratio. Thus, the 2:1 interlace ratio means that two entire display fields must be developed to generate one frame or complete image.

In circuits used to generate the control signals for the raster, it is convenient to clock the leading and trailing edge of the vertical blanking pulse, that is, the pulse which turns off the electron beam during vertical retrace, from the leading edge of the horizontal blanking pulses. In other words, both the leading edge of the vertical blanking pulse and the trailing edge thereof will be time coincident with the leading edge of horizontal blanking in the even fields. When horizontal and vertical blanking pulses are mixed to form a composite vertical blanking pulse in the even fields, a horizontal blanking pulse occurs at the same time as the non-composite vertical blanking pulse terminates and the effect is to stretch the non-composite vertical blanking pulse by the width of one horizontal blanking pulse to produce the desired composite vertical blanking pulse width. In the odd fields, on the other hand, the trailing edge of the non-composite vertical blanking pulse occurs between horizontal blanking pulses and is, therefore, shorter in duration and terminates earlier in the odd frames than in the even frames.

The uneven widths of the composite vertical blanking pulses may result in jitter of the image on the screen, and results in inaccurate digitizing of the analog signal. Both of these problems are significant in computer displays wherein very accurate rendering of the analog or digital signal is important.

In the cases of industrial and military format and in many computer displays, a composite synchronizing signal is used to drive the deflection circuits and may also be used possibly to control the digitizing of the analog signal. In some systems the synchronizing signals may be generated from the blanking signals. Uneven blanking or synchronizing signals have not typically been a problem in most television receivers used in the broadcast mode because they typically are provided with an AFC network so that if the synchronizing signals are lost, the horizontal oscillator will continue to operate so that the beam will not produce a bar or pinpoint in the event that vertical or horizontal sweep collapses. In many computer displays and other non-broadcast systems, however, the synchronizing signals and blanking signals are used directly to control the sweep of the beam, and any nonuniformities, such as differences in the widths of the vertical blanking pulses or vertical sync pulses, cause jitter and other inaccuracies in digitizing the analog signal discussed above.

SUMMARY OF THE INVENTION

In order to overcome the aforementioned problems in interlaced scanning systems, such as a 2:1 interlace, the present invention provides means for causing certain vertical control pulses, such as the composite vertical blanking pulse or the vertical sync pulse, to either have the same widths or at least terminate at the same time in each field. It has been recognized that this produces a much more accurate display free from jitter and resulting in accurate digitizing of analog information, which is particularly important in computer related displays.

In the preferred embodiment disclosed, the vertical blanking pulses or vertical sync pulses in the odd fields are lengthened so that they terminate coincident with the trailing edge of the 2H rate horizontal blanking or sync pulses, respectively. This simulates in the odd fields what naturally occurs in the even fields.

In one form of the invention, it comprises a system for controlling a raster beam generating one set of scan fields and another set of scan fields alternately time interleaved with the one set of fields and having means for developing a plurality of time sequential horizontal rate control pulses occurring at a low integer multiple of the rate of the horizontal sweep of the beam and means for developing a plurality of time sequential vertical rate control signals occurring at the same rate as the sets of scanned fields. The vertical rate pulses have a lower frequency than the horizontal rate pulses and normally have a shorter duration in one set of fields than the vertical rate pulses in the other set of fields. Pulse stretching means responsive to the horizontal and vertical rate pulses increases the duration of the shorter duration vertical rate pulses in the one set of fields to equal the duration of the vertical rate pulses in the other set of fields.

In another form of the invention, it comprises a system for controlling a raster beam generating a first set of scan fields and a second set of scan fields alternately time interleaved with each other wherein the system includes means for developing a plurality of time sequential horizontal rate control pulses and means for developing a plurality of time sequential vertical rate control pulses, the latter occurring at the same rate as the sets of fields. The vertical rate pulses have a much lower frequency than the horizontal rate pulses, and the vertical rate pulses in the first set of fields normally terminate sooner after the start of the respective fields than the vertical rate pulses in the second set of fields with respect to the starts of their respective fields. The improvement is a pulse modifying circuit responsive to the horizontal and vertical rate pulses for modifying the vertical rate pulses in one of the sets of fields to terminate at the same time relative to the starts of their respective fields as the vertical rate pulses in the other set of fields relative to the starts of their respective fields.

It is an object of the present invention to provide a system for producing control pulses occurring at the vertical rate wherein either the width or timing of the control pulses is modified so as to eliminate jitter and improper signal digitizing in the resultant image.

It is a further object of the present invention to provide such a system which can easily be incorporated into existing circuitry, either in a raster display system or a sync generator for a raster display.

These and other objects of the present invention will be apparent from the detailed description taken together with the appropriate drawings.

BRIEF DESCRIPTION OF THE DRAWINGS

FIG. 2 is a schematic of the pulse stretching circuit forming a portion of the present invention applied to the vertical blanking pulses;

FIG. 3 is a portion of the circuit shown in FIG. 2 applied to vertical sync pulses;

FIG. 4 is a timing diagram showing the relationship between the horizontal and vertical blanking pulses; and FIG. 5 is a timing diagram showing the operation of the circuit of FIG. 2 for an odd field.

DESCRIPTION OF PREFERRED EMBODIMENTS

Figure 1:
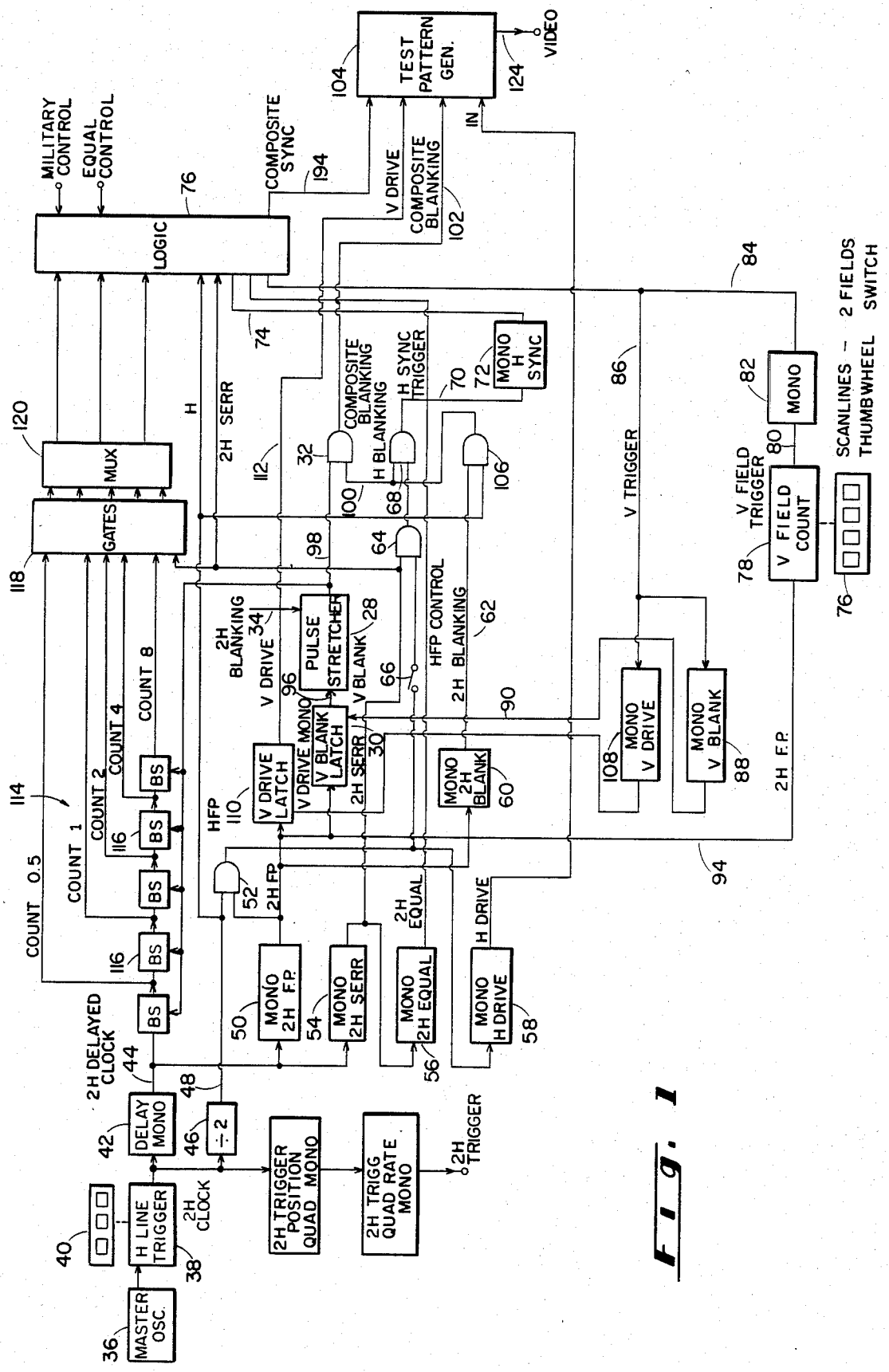
FIG. 1 is a block diagram of a sync generator including the present invention.

FIG. 4 shows the timing relationship between the horizontal and vertical blanking pulses in a typical 2:1 interlaced system. Waveform 8 comprises a plurality of negative going pulses 10 that control the blanking of the electron gun on horizontal retrace. Waveform 12 is the composite blanking signal comprising both horizontal and vertical blanking pulses, and it will be seen that non-composite vertical blanking pulse 14 terminates at point 16, but its effective width extends to point 18 of the timing diagram due to the overlap with the horizontal blanking pulse, the leading edge of which coincides with the normal unstretched trailing edge 16 of the vertical blanking pulse. Accordingly, the vertical blanking pulse 14 in the even field has a width which extends from the leading edge of a horizontal blanking pulse to the trailing edge of a further horizontal blanking pulse at the end of the vertical retrace.

Still referring to FIG. 4, in the odd fields, the vertical blanking pulses 20 no longer have their leading and trailing edges time coincident with the horizontal blanking pulses 10, so the vertical blanking pulse 20 terminates the width of one horizontal blanking pulse early as shown at 22 in the composite blanking waveform 24. The dotted portion of this waveform indicates the amount of lengthening of the vertical blanking pulses 20 in the odd fields which would be necessary to have them terminate at the same time within the fields as the vertical blanking pulses 14 in the even fields.

Referring now to FIG. 1, the present invention as shown applied to a sync generator of the type disclosed in applicant's copending application 196,154, now U.S. Pat. No. 4,417,275, filed Oct. 10, 1980, entitled "Selectable Rate Sync Generator System". The pulse stretching circuit 28 is shown connected in series between the vertical blanking latch 30 and AND gate 32. The pulse stretcher also has an input 34 connected to a source of 2H rate horizontal blanking pulses.

Master oscillator 36 is connected to H line trigger 38 having thumbwheel selector switches 40 connected thereto. Thumbwheel switches 40 are used to manually select a desired horizontal line time, and H line trigger 38 counts the cycles of the alternating current signal generated by oscillator 36 in binary coded form and compares that binary coded count with the binary coded total line time selected by switches 40 to provide on its output a train of clock pulses having twice the repetition rate (2H) of the line time selected.

The 2H rate clock pulses are delayed by monostable 42 to provide 2H delayed pulses on output 44, and the 2H clock pulses are also divided by divider 46 to provide a train of H rate pulses on output 48. The trailing edges of the 2H rate delayed pulses trigger quad rate monostable 50 to provide 2H rate front porch pulses which are combined with the H rate clock pulses by gate 52. The trailing edges of the 2H rate delayed clock pulses also trigger quad rate monostable 54 to provide 2H rate serration pulses, and the trailing edges of the 2H rate serration pulses trigger quad rate monostable 56 to provide 2H rate equalizing pulses.

The trailing edges of the H rate front porch pulses trigger quad rate monostable 58 to provide H rate drive pulses, and the trailing edges of the H rate front porch pulses also trigger quad rate monostable 60 to provide 2H rate blanking pulses on line 62.

The 2H rate serration pulses are summed with the H front porch pulses at gate 64 to provide H rate serration pulses. In the event switch 66 is open, the 2H rate serration pulses pass through gate 64, and the output of gate 64 is summed with the H rate blanking pulses at gate 68 to provide H rate sync trigger pulses on line 70, which in turn trigger quad rate monostable 72 to provide H rate sync pulses on line 74 at one of the inputs to logic circuit 76.

A desired number of scanning lines in two fields is selected by thumbwheel switches 76 which convert the number selected to binary coded form. The 2H rate front porch pulses are counted and compared with the binary coded number of scanning lines selected by V field count circuit 78 to provide V field trigger pulses on output 80 shaped by monostable 82 and placed on line 84. The trailing edges of the V trigger pulses on line 86 trigger monostable 88 to provide vertical blanking pulses on line 90 which are applied to one of the inputs of V blank latch 30, the V blanking pulses being terminated in response to the 2H front porch pulses on line 94. In the manner to be discussed below, pulse stretcher 28 lengthens the vertical blanking pulses on input 96 to produce the stretched pulses on output 98. The stretched vertical blanking pulses on line 98 are summed with the horizontal blanking pulses on line 100 by and gate 32, the output 102 of which is connected to test pattern generator 104. AND gate 106 converts the 2H blanking pulses to H blanking pulses.

The trailing edges of the V trigger pulses also trigger monostable 108 to provide vertical drive pulses to latch 110, the output 112 of which carries the vertical drive pulses. The 2H front porch pulses at one of the inputs to vertical drive latch 110 terminate the vertical drive pulses.

The 2H delayed clock pulses are counted by counting chain 114 comprising a series of bistable multivibrators 116 to provide the indicated counts. The counts are gated by gate circuit 118 and applied to logic circuit 76 through multiplexer 120, which determines the duration of the V front porch interval, the duration of the V sync pulse that is triggered by the V trigger pulse on input 84, and the duration of the V back porch interval. Logic circuit 76 also sums the negative going 2H serration pulses with the composite signal during the V front porch and V back porch intervals, and sums the positive going 2H equalizing pulses with the composite signal during the sync pulse. The composite sync, V drive, composite blanking and H drive signals are applied to the inputs of a test pattern generator 104, for example, which provides a video signal on output 124.

Referring now to FIGS. 2 and 5, one form of pulse stretching circuitry using the present invention will be described. The inputs to pulse stretching circuit 28 are the vertical blanking pulses on line 96, the horizontal blanking pulses on line 34, and a serration control 130 connected to one of the Set inputs of flip-flop 132. Control 130 permits the pulse stretching operation to be disabled when the system is in the broadcast mode, for example. Output 98 carries the stretched pulse and output 134 the unstretched pulse.

Initially, output 98 is low due to the inputs of NAND gate 136 being low. Since the vertical blanking pulse H on line 96 is negative going so that it is normally high at times outside the pulse duration, and since the Q output 138 (waveform D) of 74279 flip-flop 132 is normally high, the output of NAND gate 136 will be low. When the negative going vertical blanking pulse appears on line 96, it is inverted by inverter 140 and causes NAND gate 142 to produce a negative going pulse C (FIG. 5) to reset flip-flop 132. The output of flip flop 132 causes the output of NAND gate 136 to go high and is also inverted by inverter 133 so that waveform D on line 146 clears 7474 flip-flop 148 so that the set input 150 of flip-flop 132 remains high.

At the end of the normal vertical blanking pulse on line 96, which is waveform H in FIG. 5, the D input 152 of flip-flop 148 goes high, and on the trailing edge of the next horizontal blanking pulse (waveform A in FIG. 5), this input is clocked to the output 150 to set flip-flop 132 thereby causing output 138 to go high. At this point, both inputs 96 and 138 of NAND gate 136 are high and its output 98 will go low as indicated by waveform I in FIG. 5. Thus, the vertical blanking pulse I is stretched by the width of one 2H blanking pulse A. In the even fields, the trailing edge of the vertical blanking pulse H will coincide with the leading edge of the horizontal blanking pulse, but in the odd fields the trailing edge of the vertical blanking pulse occurs between horizontal blanking pulses, and it is necessary to use the clocking achieved by the trailing edge of a 2H blanking pulse, which is of the same width as the blanking pulse but at twice the frequency, to stretch the vertical blanking pulse.

Switch 154 selects between the stretched vertical blanking pulse on output 98 and the unstretched pulse on line 134, and connects one of them to the input 156 of mixer 32 through inverter 157. Mixer 32 also has an input 100 carrying the horizontal blanking pulses, so that the output 102 is the composite blanking signal.

FIG. 3 illustrates a circuit 158 substantially identical to a portion of circuit 28 in FIG. 2, which has its inputs connected to stretch the synchronizing pulses in the odd fields. The vertical synchronizing signal on line 160 is connected through inverter 162 to one of the inputs of NAND gate 164, the other input 166 of which is connected by line 168 to the Q output of flip-flop 170. As previously, the serration control 172 is connected to one of the Set inputs for flip-flop 170. The Q output of flip-flop 170 is connected by line 174 to an inverter which is connected to the Clear input of flip-flop 180.

The 2H synchronizing pulses, which are synchronizing pulses of the same width as the horizontal synchronizing pulses but at twice the frequency, are connected to the clocking input of flip-flop 180 by a line 182, and the $\bar{Q}$ output is connected to the other said input of flip-flop 170 by line 184. The vertical synchronizing pulse input 160 is also connected by line 186 to the D input of flip-flop 180. NAND gate 188 has as its inputs the unstretched vertical synchronizing pulses on line 190 and the output of flip-flop 170 such that the stretched vertical synchronizing pulses appear on output 192. The operation of circuit 158 is virtually identical to that of circuit 28 in FIG. 2. Specifically, when the vertical synchronizing pulse on input 160 goes high at the normal time in an odd field, the other input 168 for NAND gate 188 is held low because of the state of flip-flop 170, and this continues until the trailing edge of the horizontal synchronizing pulse at the 2H rate occurring at that time so that the vertical synchronizing pulse is stretched by the width of one of the 2H sync pulses. The vertical synchronizing pulse output 172 can be mixed with the horizontal synchronizing pulses to produce the composite synchronizing pulse train on line 194. As is known, the vertical synchronizing pulses at the vertical and horizontal rates are triggered by the vertical and horizontal trigger pulses and shaped to have the proper width.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A system for controlling a raster beam generating one set of scan fields and another set of scan fields alternately time interleaved with the first set of fields, the system comprising: means for developing a plurality of time sequential horizontal rate control pulses synchronized with the horizontal sweep of the beam and occurring at a frequency at least as high as the frequency of the horizontal sweep, means for developing a plurality of time sequential vertical rate control pulses occurring at the same rate as the sets of scan fields, the vertical rate pulses having a lower frequency than the horizontal rate pulses, the vertical rate pulses normally having a shorter duration in one set of fields than the vertical rate pulses in the other set of fields, and pulse stretching means responsive to the horizontal and vertical rate pulses for increasing the duration of the shorter duration vertical rate pulses in the one set of fields to equal the duration of the vertical rate pulses in the other set of fields.

2. The system of claim 1 wherein the vertical control pulses are vertical blanking pulses and the horizontal control pulses are 2H rate horizontal blanking pulses.

3. The system of claim 2 wherein said pulse stretching means comprises a gating circuit having one input connected to the 2H rate horizontal blanking pulses, a second input connected to the vertical blanking pulses, and means for causing the termination of each of the vertical blanking pulses to coincide with the trailing edge of one of the 2H rate horizontal blanking pulses.

4. The system of claim 1 wherein, the vertical and horizontal control pulses are vertical blanking pulses and 2H rate horizontal blanking pulses, respectively, and the pulse stretching means comprises means for causing the vertical blanking pulses in said one set of fields to terminate at the same time relative to the start of their respective fields as the vertical blanking pulses in the other set of fields relative to the start of their respective fields.

5. The system of claim 1 wherein said pulse stretching means comprises a gating circuit having a first input connected to the horizontal rate pulses, a second input connected to the vertical rate pulses, an output, and means responsive to the pulses on the inputs for gating the vertical rate pulses on the second input through to the output and for delaying the termination of the shorter duration vertical rate pulses to cause them to terminate at the same time positions in their respective fields as the vertical rate pulses for the other set in their respective fields.

6. The system of claim 5 wherein the vertical rate pulses are vertical blanking pulses.

7. The system of claim 5 wherein the vertical rate pulses are vertical sync pulses.

8. The system of claim 5 wherein said means for delaying comprises means for causing each shorter duration pulse to terminate coincident with the trailing edge of one of the horizontal rate pulses.

9. In a system for controlling a raster beam generating a first set of scan fields and a second set of scan fields alternately time interleaved with the first set of fields, the system including means for developing a plurality of time sequential horizontal rate control pulses, and means for developing a plurality of time sequential vertical rate control pulses occurring at the same rate as the sets of fields, the vertical rate pulses having a much lower frequency than the horizontal rate pulses, the vertical rate pulses in the first set of fields normally terminating sooner after the start of their respective fields than the vertical rate pulses in the second set of fields with respect to the starts of their respective fields, the improvement being pulse modifying means responsive to the horizontal and vertical rate pulses for modifying the vertical rate pulses in one set of the fields to terminate at the same time relative to the starts of their respective fields as the vertical rate pulses in the other set of fields relative to the starts of their respective fields.

10. The system of claim 9 wherein said pulse modifying means comprises a gating circuit having one input connected to the horizontal rate pulses, a second input connected to the vertical rate pulses, and means for producing on an output a series of modified vertical rate pulses wherein each modified vertical rate pulse on the output terminates time coincident with the trailing edge of one of the horizontal rate pulses.

11. The system of claim 10 wherein said means for producing modified vertical rate pulses stretches the vertical rate pulses in the first set of fields to have the same width as the vertical rate pulses in the second set of fields.

12. The system of claim 9 wherein said pulse modifying means stretches the vertical rate pulses in the first set of fields to have the same width as the vertical rate pulses in the second set of fields.

13. The system of claim 12 wherein said vertical rate pulses are vertical blanking pulses.

14. The system of claim 12 wherein said vertical rate pulses are vertical sync pulses.

15. The system of claim 9 wherein said pulse modifying means comprises a gating circuit having one input connected to the horizontal rate pulses, a second input connected to the vertical rate pulses, and means for gating through to an output the vertical rate pulses on the input and stretching the vertical rate pulses in the first set to have the same width as the vertical rate pulses in the second set.

16. The system of claim 9 wherein said pulse modifying means comprises a gating circuit having one input connected to the horizontal rate pulses, a second input connected to the vertical rate pulses, and means for gating through to an output the vertical rate pulses on the input and delaying the termination of the vertical rate pulses in the first set such that they terminate at the same positions in their respective fields as the vertical rate pulses in the second set in their respective fields.

* * * * *